Jan. 19, 1932.　　　　　C. S. ASH　　　　　1,842,140
DEMOUNTABLE INTERCHANGEABLE WHEEL MOUNTING
Filed May 15, 1924　　　3 Sheets-Sheet 1

Inventor
Charles S. Ash,
By
Attorneys

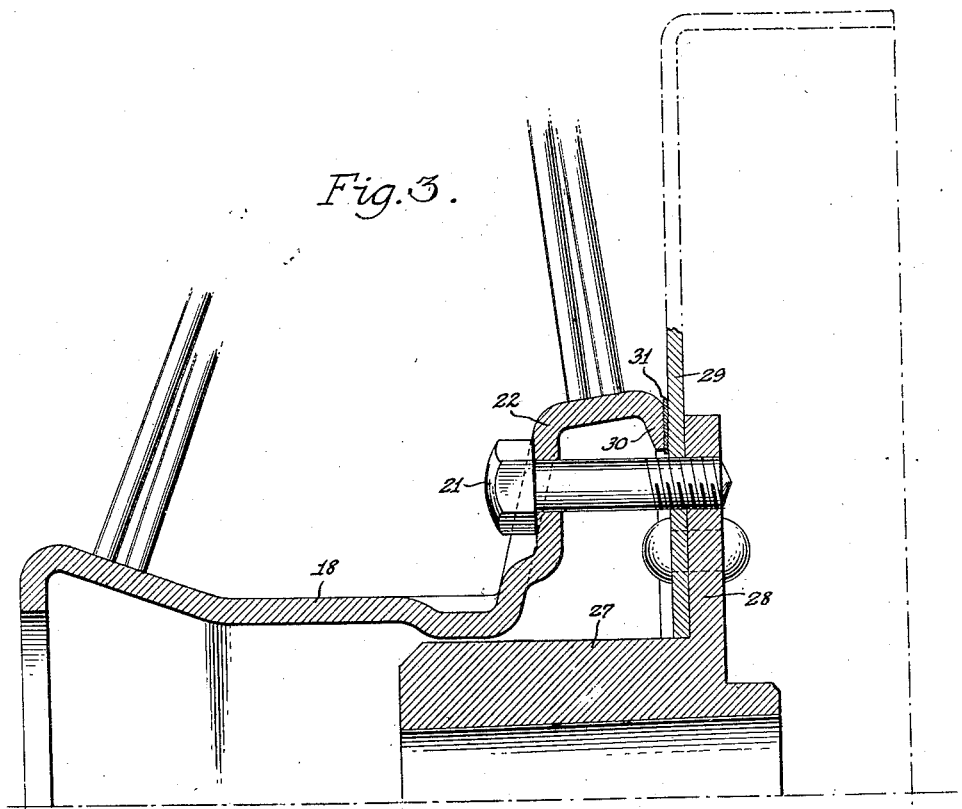
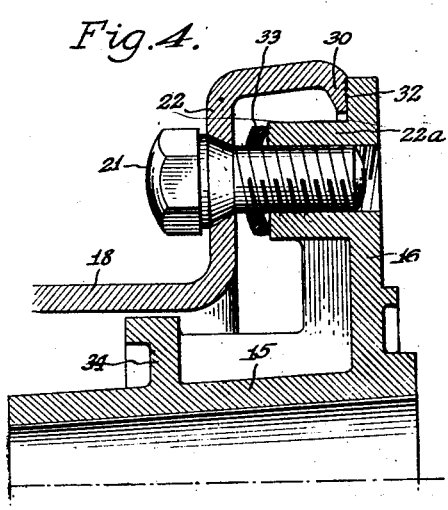

Jan. 19, 1932. C. S. ASH 1,842,140
DEMOUNTABLE INTERCHANGEABLE WHEEL MOUNTING
Filed May 15, 1924 3 Sheets-Sheet 3
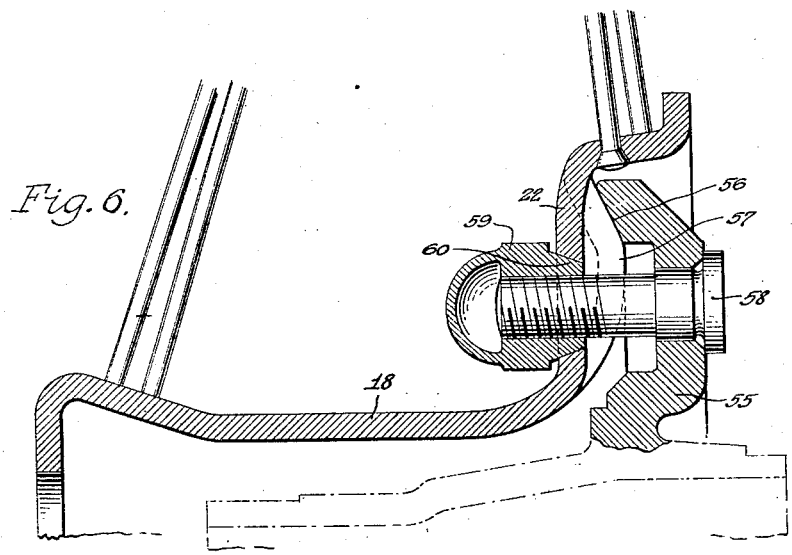
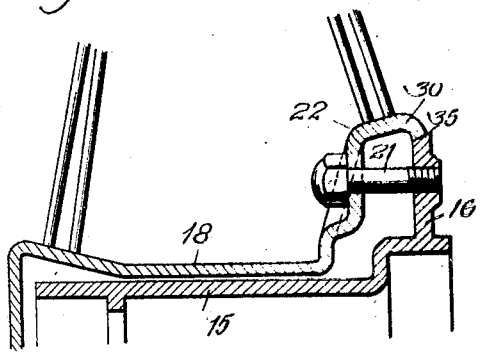
Inventor
Charles S. Ash,
By
Attorneys Patented Jan. 19, 1932

1,842,140

UNITED STATES PATENT OFFICE

CHARLES S. ASH, OF ROYAL OAK, MICHIGAN, ASSIGNOR TO KELSEY-HAYES WHEEL CORPORATION, OF DETROIT, MICHIGAN, A CORPORATION OF NEW YORK

DEMOUNTABLE INTERCHANGEABLE WHEEL MOUNTING

Application filed May 15, 1924. Serial No. 713,615.

Wire wheels as commonly constructed include a hub shell which is sleeved upon the inner or wheel hub and into which shell the wire spokes are laced. This hub shell is usually supported upon the inner hub at two or more points, usually upon a taper seat adjacent the inner end of the hub, and a corresponding seat near the outer end of the hub, with means for holding the shell in place upon the inner hub. It is also necessary in such constructions that some means be provided for preventing relative rotation between the hub and shell to take care of the driving and braking strains. Such constructions are expensive to manufacture due to the accuracy with which the parts must necessarily be machined, and further, it is usually necessary to provide separate locking means for preventing the accidental displacement of the means which is provided for holding the shell upon the hub. Unless care is exercised in mounting the wheel, the parts are not properly assembled and locked, and if not so assembled and locked, the wheel may become loose in use and be detached from the hub, causing serious accident.

The object of the present invention is to simplify and cheapen the construction of demountable wire wheels and further to facilitate mounting of the wheel and insure accuracy and security in such mounting. It is also an object to provide a construction wherein a simple and efficient wheel or inner hub construction may be employed and wherein great accuracy in the manufacture of the wheel is not required and a very simple, strong and rigid construction and attachment of the shell to the hub is secured. A further object is the securing of a construction having a minimum number of parts, and wherein the removal or replacement of the wheel is facilitated and accuracy of mounting secured without the necessity for exercising extreme care in the mounting of the wheel and securing it in place upon the hub. A further object is to secure simple means for securing the wheel in place upon the hub, which means will rigidly hold the wheel in place and obviate the possibility of accidental disconnecton and demounting of the wheel. It is also an object to provide a construction and arrangement whereby all load, driving and braking strains are transmitted between the hub shell and inner driving or mounting member through a frictional connection between these parts, and in which the means for creating such frictional connection also serves as fastening means for holding the wheel in place upon said inner member, and which fastening means may be quickly and easily removed for the purpose of demounting the wheel. A further object is to provide an arrangement whereby the hub shell is connected to the inner mounting at the inner end only of the hub shell and the necessity for securing and locking means at the outer end of the shell is obviated. A further object is to provide certain other new and useful features in the construction and arrangement of parts, all as hereinafter more fully described.

With the above and other ends in view the invention consists in so mounting and securing the shell in place upon the inner mounting that said shell will be supported adjacent its inner end only and will be secured in place by means also located adjacent its inner end, thereby obviating the necessity for providing a bearing for the shell upon the inner member which is separate and distinct from the means for taking the load and torsional strains, and which bearing and driving means are also separate and distinct from the means for securing the shell in place upon the inner member. The invention further consists in the construction and arrangement of parts whereby simplicity and cheapness of construction are secured, and accuracy and facility of mounting and demounting insured. The invention further consists in certain other new and useful features in the construction, arrangement and combination of parts, all as hereinafter more fully described and particularly pointed out in the appended claims, reference being had to the accompanying drawings, in which Figure 1 is a vertical section through the upper half of a wheel and hub embodying features of the present invention and illustrative of the same;

Fig. 3 is an enlarged sectional detail showing a further application of the invention to different hub structures and a further modification of the invention as applied to such structures;

Fig. 4 is a sectional detail similar to Fig. 3, in which the construction is modified to illustrate the application of the invention to another form of inner hub;

Fig. 5 is an enlarged sectional detail illustrating a further modified application of the present invention;

Fig. 6 is a sectional detail showing a further modification of the present invention and adaptation thereof.

In demountable wire wheel structures employing a hub shell into which the wire spokes are laced, it has been the practice to provide a bearing for this shell upon the inner or permanent wheel hub, adjacent the inner end of the hub and to also provide a second bearing for the outer end of the shell, said outer bearing usually comprising a member screwed upon the outer end of the hub to engage the outer end of the shell and hold the shell in place upon the hub, at the same time forming a bearing for the outer end of the shell. In order to prevent this outer bearing member from becoming accidentally detached and permitting the wheel to come off, separate locking means has been provided.

Further, it has been the common practice to provide a driving connection between the inner hub and the shell to take the driving strains, but in the present instance it is proposed to combine the bearing, the driving and the locking or holding means in such a manner as to greatly simplify construction and cheapen manufacture by obviating the necessity for accurate machining operations.

The supporting of the outer end of the hub shell upon the inner hub has been found to be unnecessary, as such hub shells are necessarily of comparatively large diameter and are usually formed from sheet metal of a gauge sufficient to give the necessary rigidity to the shell to carry the load applied to its overhanging or unsupported outer end. Elimination of the outer end support not only simplifies construction in that respect, but also provides for the use of a simple means at the inner end of the hub for securing the wheel in place, such securing means being readily removable for the purpose of demounting the wheel, and the hub shell may therefore be provided with a permanent end closure or cap which is unconnected with the inner hub and comes away with the shell when the wheel is demounted.

Figure 1:
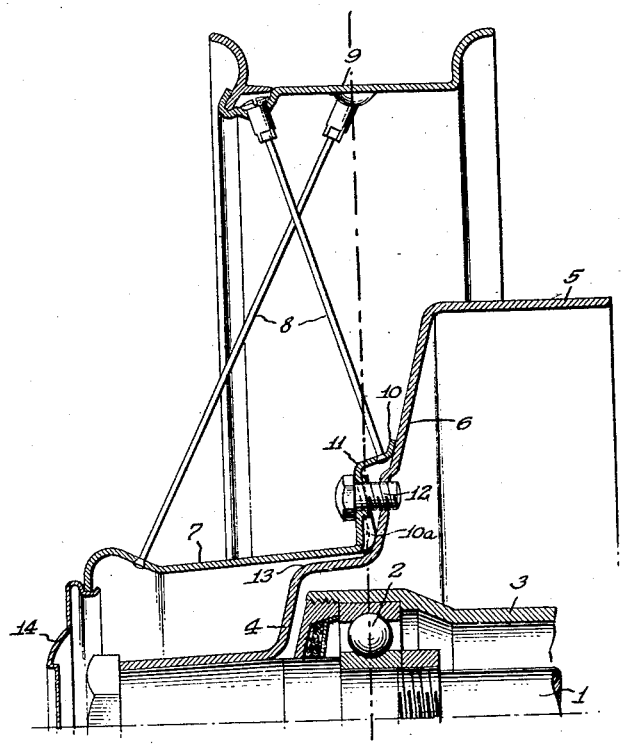

In the construction shown in Fig. 1, 1 indicates the drive shaft of the axle which is supported by a suitable bearing 2 within the fixed or non-rotatable axle housing 3. The shaft 1 projects from the end of this housing, and secured thereto in any suitable manner to turn therewith is an inner mounting member 4, which in the construction shown in Fig. 1, is formed with an integral brake drum 5, the wall 6 of which brake drum provides a place of attachment for a demountable wire wheel which wheel comprises a hub shell 7 into which the wire spokes 8 are laced, with their outer ends connected in the usual manner to any suitable rim structure 9. The inner end of the hub shell is flanged outwardly as at 11 and the peripheral edge portion 10 of this flange is formed to conform to the inclination of the drum wall 6 and seat thereagainst. Flanged openings are provided in the shell flange 11 to receive securing bolts 12 which are screwthreaded to engage screwthreaded openings in the drum wall 6. Adjacent the meeting angle of the shell 7 with its flange 11, said flange is formed to seat against the drum wall 6 and thus when the shell is in place and the bolts 12 are turned up to draw the flange 11 and its edge 10 into firm frictional engagement with the wall 6, the shell will be rigidly and firmly held in place upon the inner hub and the bolts 12, of which there may be any desired number located around the hub, are relieved of all strains other than the strain of drawing the shell into frictional contact with the drum wall, by reason of this frictional contact, which will be sufficient to prevent any movement of the shell upon the drum wall and also sufficient to transmit the driving torque. The inner hub or mounting 4 may be enlarged adjacent its merging into the drum wall 6 to provide a shoulder 13, which shoulder is simply and solely for the purpose of guiding the hub shell to place during the operation of mounting the wheel upon the hub, but the shell 7 when secured in place does not engage the shoulder, and the outer end of the shell is entirely unsupported. It is supported solely at its inner or flanged end and is of sufficient rigidity to take the load applied to its unsupported or overhanging outer end. As the outer end of this shell is unsupported by and unconnected to the inner hub, it may be provided with a permanent cap or closure 14 which will come away with the wheel when the wheel is demounted by removing the bolts 12.

In this construction no locking or other securing means is necessary at the outer end of the hub or shell, and the same bolts 12 which secure the wheel in place also serve to effect a driving connection between the hub and shell by drawing these parts into firm frictional contact and the slight yielding action of the shell flange 11 between its edge contact 10 with the drum wall and its shoulder 10a bearing against said wall will serve to lock the bolts against jarring loose. The operation of demounting the wheel is therefore simple, as it is only necessary to remove the bolts 12 and the mounting of the wheel is likewise a simple operation, and when completed, the wheel is rigidly and securely held in place upon the driving or inner mounting member 4 against any possibility of accidental displacement, the zone of attachment being also the zone of support which is within or adjacent the load plane of the wheel and the vertical plane of the bearing 2.

Figure 2:
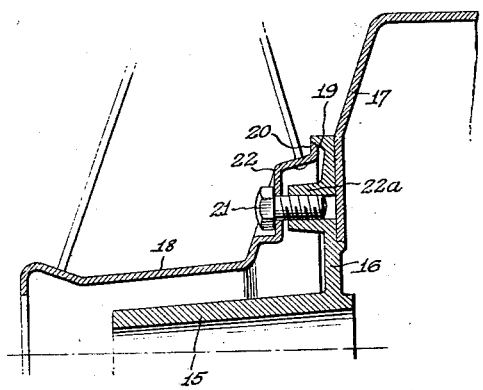
Fig. 2 is a sectional detail showing a modified construction wherein the arrangement of support for the shell upon the hub and the driving connection between the hub and shell is modified to illustrate a further application of the invention to different inner hub constructions.

In Fig. 2 a wheel construction embodying the invention is shown as applied to an inner cast metal hub 15 having an outwardly extending annular flange 16 forming a part of the drum wall or to which said drum 17 is secured. The wheel hub shell 18 is attached to and supported entirely by the flange 16, by forming said flange with an inclined annular surface 19 adjacent its outer-edge to be engaged by the outwardly extending formed annular edge portion 20 of the shell. The annular edge of the shell and the inclined surface 19 are accurately machined so that the shell will fit closely against this inclined surface and may be brought into strong frictional contact therewith by means of bolts 21 passing through the outwardly extending inner end portion of the wall 22 of the shell and engaging screwthreaded openings in bosses 22a formed on the flange 16.

In Fig. 3 is shown a construction which is particularly adapted to be substituted for a wood or artillery wheel and is very simple in its construction and cheap to manufacture, the wheel hub 27 as commonly constructed for carrying wood spokes, being utilized in substantially its usual form with the integral flange 28 at its inner end to which the brake drum wall 29 is secured in the usual manner. Bolts similar to the bolts 21 are substituted for the usual bolts which hold the wood spokes in place, the holes in the flange and drum wall being tapped out to receive these bolts which pass through openings in the outwardly flanged wall 22 of the shell 18. The peripheral edge portion 30 of this wall 22 is turned inwardly to oppose the outer surface of the drum wall 29 and a ring 31 of friction material is preferably interposed between these opposed surfaces and the surfaces roughened to increase the frictional contact between this edge portion of the shell and the drum when the bolts are turned up. The entire shell is unsupported except through this frictional engagement of its edge portion with the wheel drum, and the bolts are relieved of all torsional and load strains due to this strong frictional engagement, the bolts simply serving to draw the shell toward the hub flange and maintain this frictional contact by reason of which contact the shell is firmly held against both lateral and rotative movement relative to the drum and flange. As the outwardly extending wall 22 of the shell is spaced from the drum, when the bolts are turned up, it will spring or yield slightly toward the drum and thus bind the bolts in their screwthreaded openings in said drum and flange, so that they cannot become accidentally displaced. In this construction the torsional and load strains are transmitted to the wheel within the zone of attachment of the wheel to the inner driving or other member carried by the axle.

In Fig. 4 is shown a construction similar to that shown in Fig. 3, except that the friction ring 31 is omitted and the inturned flange or edge portion 30 of the shell directly engages the outer face of the flange 16 on a hub 15 similar in construction to hub construction shown in Fig. 2, the contacting surface of the flange being roughened as shown at 32. The boss 22a is also shown and provided with a screwthreaded opening to receive the bolt 21, but interposed between the end of the boss and the wall 22 of the shell is a spring washer 33 having a screwthreaded opening to receive the bolt, so that when the bolt is screwed in, the washer will engage the end of the boss and by reason of its being transversely curved, will be sprung or flattened slightly and thus grip the bolt. When the bolt is retracted in taking the wheel off, the bolt will turn and recede from the opening in the boss and also through the washer until the end of the bolt leaves the bore of the boss, when the wheel will come away, carrying the bolt with it, the washer holding the bolt against dropping out of the opening in the wall of the shell and becoming lost. An outwardly extending annular rib 34 may be provided on the hub 15, as shown, for the purpose of guiding the shell to place but there will be clearance between this flange and shell so that the flange will serve as a guide only, all load and driving strains being taken by the inturned edge portion 30 of the shell in frictional contact with the hub flange 16, and no matter how slight this clearance may be, if the bolts are properly drawn up to give the proper frictional contact between shell and flange no load will be taken by the flange 34.

In Fig. 5 is shown a construction similar to that shown in Fig. 4 with the exception that the inwardly turned edge 30 of the shell is formed with an edge surface to engage over an inclined edge surface 35 formed on the flange 16. When the shell is forced to place by the bolts 21, the inclined edge surface on the shell is brought into frictional contact with the surface 35 and as said surface is inclined to the axis of the movement of the shell longitudinally, there is a wedging action which creates a strong frictional contact and the torque and load strains are taken at this point of frictional contact, the shell being accurately centered upon the hub and supported entirely by the peripheral inclined edge 35 of the flange 16. The shell is unsupported except upon the annular edge of the flange 16 and the bolts 21 simply serve to draw the parts into frictional engagement, which engagement is sufficient to prevent any relative rotative or lateral movement, and as such movement is entirely lacking, the bolts 21 are relieved of all strains except the strain of forcing the shell into frictional contact with the flange.

Referring to the construction shown in Fig. 6, the annular flange 55 on the inner hub is formed with an inclined friction surface 56 provided by an annular groove in the outer face of the flange, and in the disk wheel construction the disk is offset adjacent the axle opening therein to receive the hub, which offset portion provides an inclined wall to engage the inclined surface 56 on the hub flange and thus create a strong frictional contact between the surfaces to take the load and driving strains. The hub shell 18 of the wire wheel has its outwardly extending wall 22 formed with an offset 57 to engage within the groove in the flange 55 and to provide an inclined surface to meet the surface 56 of the groove. When the shell is drawn toward the flange by means of the bolts 58 passing through the flange and through openings in the wall 22, the inclined surface of the annular offset on the shell is drawn into firm frictional engagement with the inclined surface of the groove in the flange and thus the hub shell is accurately centered upon the inner hub and supported solely by the flange, this frictional engagement of the shell with the flange serving to transmit all torsional strains from the inner hub to the wheel and to also take the load strains. If found desirable, the nuts 59 on the outer ends of the bolts 58 may be formed each with a conical inner end portion 60 to engage within a conical opening provided therefor within the wall 22 of the shell, so that when the nuts are turned up to force the shell toward the flange 55, the conical inner ends 60 of the nuts will be frictionally engaged within the openings in the shell wall to prevent accidental turning of the nuts which would permit the wheel to become loose on the inner hub. In this construction the engagement of the annular offset on the shell within the annular groove in the hub flange, centers the shell upon the hub and provides a driving friction between the flange and shell, and by securing the shell in place by means of a single row of bolts, the wheel may be quickly detached, and the bolts are relieved of driving and load strains.

In each of the several constructions shown in the drawings, the hub shell of the demountable wire wheel is attached to and supported by the inner driving or mounting member of the axle, adjacent the inner end of the shell, and the outer end of the shell is unsupported, the load strains thereon being taken by the shell itself which overhangs the outer end of the inner axle member, and the clearance between the inner hub or axle member and the outer end portion of the shell may be very small, even to a few thousandths of an inch, but if the shell is supported concentrically with the inner hub and has such a strong frictional engagement therewith that it cannot move in the slightest degree laterally, said outer end portion of the inner hub will take none of the load on the wheel, and this clearance between the hub and the outer end of the shell will be maintained under all conditions.

In each of the several constructions shown, the zone of attachment of the wire wheel hub shell to the inner hub or axle member is adjacent the inner end of the shell and the means for transmitting torsional strains and taking the load is also located adjacent but outwardly of this zone, so that the means provided for detachably holding the wheel in place will be relieved of all load and driving strains, and the frictional contact between shell and hub portions will be well radially outward from said fastening means or bolts so as to extend the diameter of such contact area and increase its effectiveness in taking driving and load strains.

Having thus fully described my invention, what I claim is:

1. In a wheel, the combination of a hub shell and means for detachably attaching the inner end portion of said shell to an axle member, said shell being formed with an annular seat outwardly from the wheel axis beyond said attaching means and adjacent the inner end of the shell, said seat forming a place of contact of said shell with said axle member and said attaching means being arranged to force said shell yieldingly into strong frictional contact with said axle member at said seat only.

2. The combination with a rim, a hub shell, and spokes connecting the shell to the rim, of means for detachably attaching said shell to an axle member at the inner end of the shell, said shell being formed with a continuous annular seat concentric with the wheel axis to seat upon said axle member outwardly of the wheel beyond said attaching means, said attaching means being arranged to create a driving and load carrying frictional connection between said shell and axle member at said seat only.

3. In a wheel, the combination of a hub shell and means for detachably attaching said shell adjacent the inner end portion of the shell to an axle member having an outwardly extending flange, the inner end of said shell being enlarged in diameter and formed with an annular seat to seat against said flange, and said attaching means including fastening members engaging the enlarged inner end portion of the shell inwardly of said annular seat for forcing said seat into frictional contact with said flange, said portion of said shell engaged by said fastening member being unseated and adapted to yield under the force of said fastening members in forcing said shell to its seat on said flange.

4. In a wheel, the combination of a hub shell having an enlarged inner end portion provided with a series of spaced apart openings about the axis of the shell, and bolts engaging said openings for detachably attaching the shell to an outwardly extending flange on an axle member, the edge portion of the enlarged inner end of the shell being formed with a seat to seat upon said flange, the seating surface of which seat is inclined to the axis of the shell to engage a similarly inclined portion of the flange, said seat being at a greater radial distance from the axis of the wheel than said bolts, and said portion of said shell through which said bolts extend being unseated, said shell engaging said axle member at said seat only, whereby the strain of said bolts is applied to a yielding portion of said shell inwardly from said seat.

5. In a vehicle wheel, the combination of an inner hub, an outer hub, radially-spaced inter-hub seating surfaces arranged in zones displaced axially from each other, and means for securing said hubs together engaging said outer hub in the zone between said inter-hub seating surfaces.

6. In a vehicle wheel, the combination of an inner hub having a substantially radial bearing face, an elongated outer hub having a complemental bearing face engaging with the first and provided with anchorage zones for two sets of rim supporting means, one of said zones being adjacent said bearing face and the other at a substantial distance outwardly of said bearing face, and common means for centering and securing the outer hub to the inner hub with said complemental bearing faces in engagement.

7. In a vehicle wheel, the combination of an inner hub having a radial flange, an elongated outer hub having its inner end flared outwardly to form a radially extending portion, and an inwardly offset portion extending from said radially extending portion, said flange and inwardly offset portion being provided with complemental inter-hub bearing surfaces, and additional inter-hub bearing surfaces spaced from the first named bearing surfaces, and axially extending securing means engaging the outer hub in the zone between said bearing surfaces for clamping it to the inner hub.

8. In a vehicle wheel, the combination of an inner hub having a radial flange, an elongated wire wheel outer hub having an outwardly flared portion complemental to said radial flange, radially spaced inter-hub seating surfaces on said flange and the outwardly flared portion of said wire wheel hub, and means engaging said outer hub in the zone between said inter-hub seating surfaces for clamping it to the inner hub.

9. In a vehicle wheel, the combination of an inner hub, an elongated outer hub provided with anchorage zones for two sets of rim supporting means, radially spaced inter-hub seating surfaces on the inner and outer hubs, one of the anchorage zones being adjacent the seating surfaces and the other at a substantial distance outwardly of the seating surfaces, and common means at the zone between the seating surfaces for centering and securing the outer hub to the inner hub with the seating surfaces of the outer hub in engagement with the seating surfaces of the inner hub.

In testimony whereof I affix my signature.

CHARLES S. ASH.